US006450873B2

(12) United States Patent
van der Steen et al.

(10) Patent No.: US 6,450,873 B2
(45) Date of Patent: Sep. 17, 2002

(54) METHOD AND DEVICE FOR PROCESSING POULTRY

(75) Inventors: Franciscus T. H. J. van der Steen, Delft; Francis W. J. van Happen, St. Hubert; Adrianus J. van den Nieuwelaar, Gemert, all of (NL)

(73) Assignee: Stork PMT B.V., Boxmeer (NL)

( * ) Notice: Subject to any disclaimer, the term of this patent is extended or adjusted under 35 U.S.C. 154(b) by 0 days.

(21) Appl. No.: 09/761,567

(22) Filed: Jan. 16, 2001

Related U.S. Application Data

(63) Continuation of application No. PCT/NL99/00432, filed on Jul. 7, 1999.

(30) Foreign Application Priority Data

Jul. 16, 1998 (NL) ............................................. 1009670

(51) Int. Cl.[7] ............................................. A22C 21/00
(52) U.S. Cl. ..................................................... 452/185
(58) Field of Search ............................... 452/188, 185, 452/149, 154, 155, 166, 169, 117, 118

(56) References Cited

U.S. PATENT DOCUMENTS

| | | | |
|---|---|---|---|
| 3,958,303 A | 5/1976 | Scheier et al. | |
| 4,581,789 A | 4/1986 | Meyn | |
| 4,597,136 A | 7/1986 | Hazenbroek | |
| 4,669,148 A | * | 6/1987 | Scheier ....................... 452/185 |
| 5,429,549 A | 7/1995 | Verrijk et al. | |
| 5,569,072 A | 10/1996 | Tieleman et al. | |
| 5,707,280 A | * | 1/1998 | Tieleman et al. ........... 452/118 |

FOREIGN PATENT DOCUMENTS

| | | |
|---|---|---|
| EP | 0 395 169 A | 10/1990 |
| EP | 0 400 696 A | 12/1990 |
| EP | 0 562 661 A | 9/1993 |
| FR | 2 624 695 A | 6/1989 |
| NL | 8 400 170 A | 7/1986 |
| NL | 8 602 922 | 6/1988 |

* cited by examiner

*Primary Examiner*—Thomas Price
(74) *Attorney, Agent, or Firm*—John S. Pratt; Kristin L. Johnson; Kilpatrick Stockton

(57) ABSTRACT

In a method and device for carrying out at least one processing operation on a slaughtered bird which is hung by its legs, the bird is conveyed on a hook of a conveyor towards and into the processing area of a processing device in order for the at least one processing operation to be carried out on the bird. The bird is positioned in the processing area of the processing device by externally supporting the bird at at least two locations, which are selected from the group of locations which comprises the back, the sternum, the area of the clavicle, the wings and the sides of the bird. Then, the at least one processing operation is carried out in the processing device in the area of the breast of the bird. The bird may also be positioned in the processing area of the processing device by internally supporting the bird on the side of the sternum facing the abdominal cavity of the bird.

108 Claims, 9 Drawing Sheets

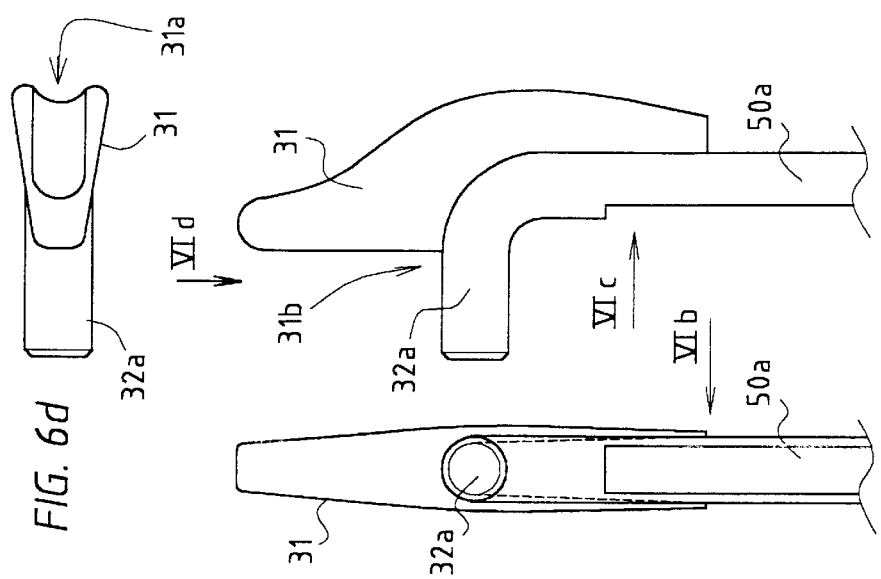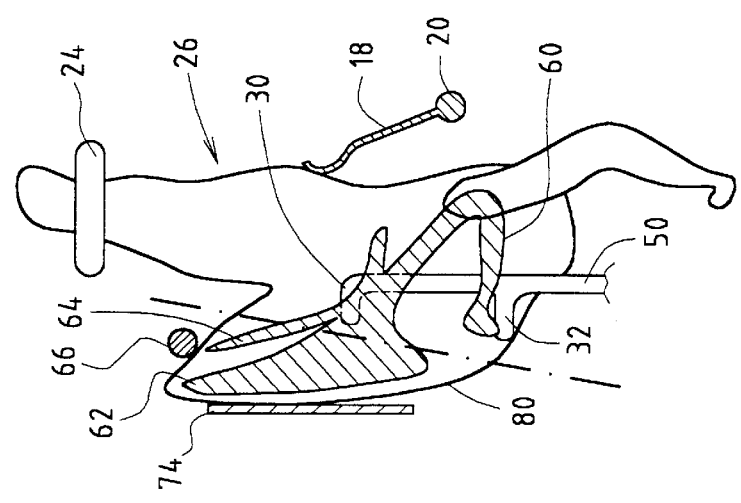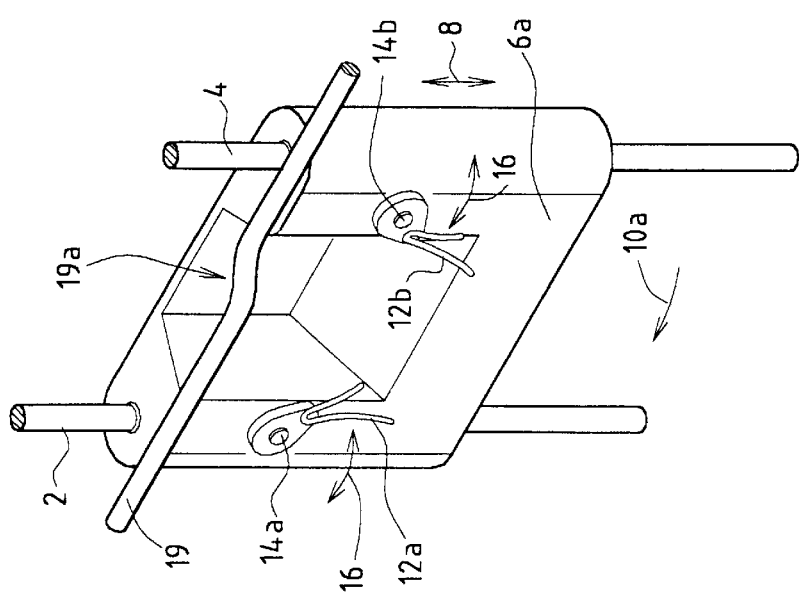

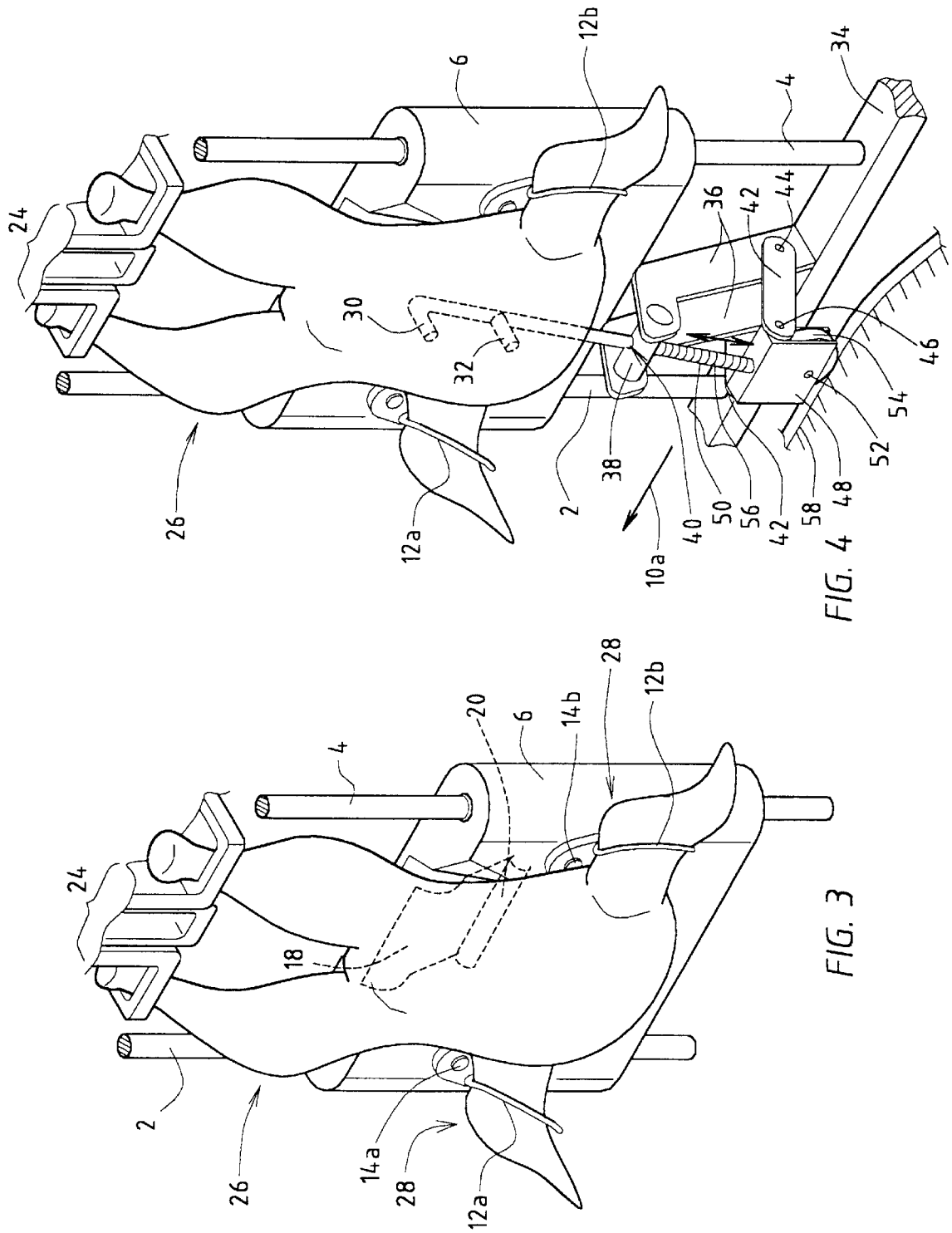

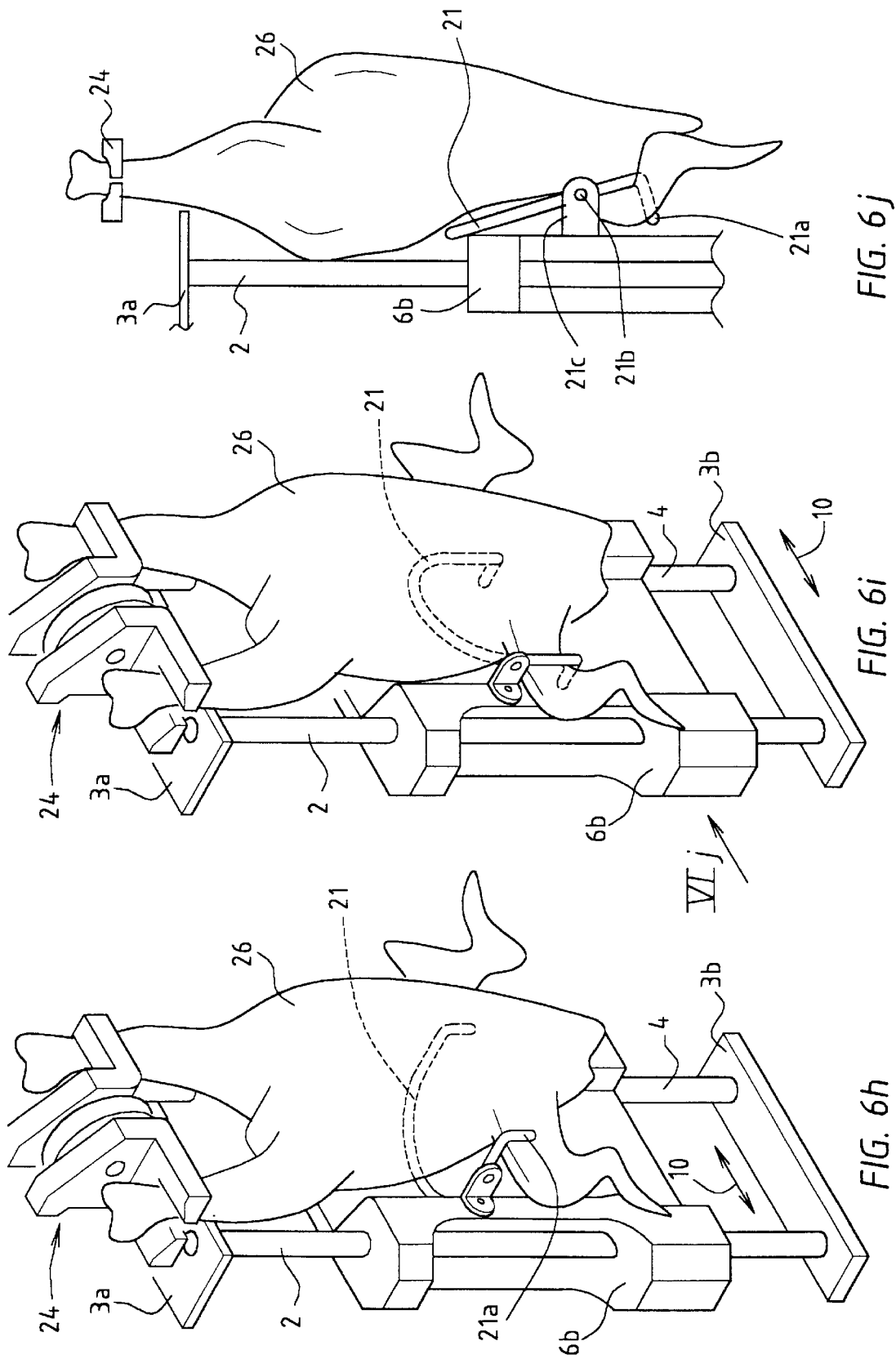

METHOD AND DEVICE FOR PROCESSING POULTRY

CROSS-REFERENCE TO RELATED APPLICATIONS

This is a continuation application of PCT/NL99/00432 filed Jul. 7, 1999.

FIELD OF THE INVENTION

This invention relates to a method and device for processing a slaughtered bird which is hung by its legs from a hook of a moving conveyor. Methods and devices of this nature are generally known.

DISCUSSION OF THE PRIOR ART

A special processing operation carried out on a slaughtered and eviscerated bird is a partial processing operation in which an automatic or semi-automatic processing device is used to obtain bird parts which are each of substantially identical weight or contain an equal amount of meat, irrespective of the body part (such as breast, wing, thigh, drumstick) which the bird part comprises. Since the amount of meat per bird part is relatively limited, the division must be carried out as accurately and reproducibly as possible, in order to keep differences in weight or amount of meat between the different bird parts within predetermined limits. A division which satisfies this requirement can only be carried out if the bird is accurately positioned in the processing device. The known methods and devices are not entirely satisfactory with regard to this point.

EP-B-0,033,177 describes a device for dividing a bird into nine parts, each of substantially the same weight. To this end, the bird has to be manually arranged on a positioning support which acts on the bird at the location of the ankle joints and the wings, and also supports the bird at the sides of the body, the top of the thighs, behind the spinal column and on the back. Then, various blades are used to automatically cut through the carcass, the breast and a first wing being cut off successively, and then a body longitudinal-halving cut being made, the other wing and the complete legs being cut off, and the drumsticks being cut free from the thighs.

A drawback of the device described in EP-B-0,033,177 is that it is not suitable for picking up and processing birds which have been supplied in a conveyor, such as an overhead suspension conveyor, without human intervention; the birds have to be arranged manually on the positioning supports. Furthermore, the bird is not optimally positioned on the positioning support.

EP-A-0,545,040 describes a device for cutting off a breast part of a bird, the wings already having been removed from the bird. The bird is hung by its legs from a hook and is internally supported by means of a mandrel which substantially fills the body cavity and causes the breast of the bird to project outwardly by exerting pressure on the ribs of the chest. On the outside of the carcass, there is a pivotable retention plate which interacts with an opposite surface of the mandrel and, on the side which is to face the mandrel, comprises a projection which clamps the clavicle of the bird against the mandrel. The retention plate also supports the shoulders of the bird. After the bird has been fixed in position in this way, firstly a stationary blade is used to make a transverse guide cut, at an angle to the carcass surface, in the abdomen of the bird, between the pelvis and the breastbone. Then, a rotating blade is used to make a transverse cut, at an angle to the carcass surface, in the breast of the bird, in order to separate the breast from the neck, shoulders and upper back of the bird. Finally, in the path of the transverse guide cut, a second cut is made with a rotating blade, in order to separate the breast from the pelvis and the lower back of the bird.

A drawback of the device according to EP-A-0,545,040 is that it is necessary for a voluminous mandrel to be introduced into the body cavity of the bird in order to make the desired cuts, but the positioning of the breast of the bird is not optimum for a cut/cuts to be made, as a result of the breast being supported by the mandrel in the area of the ribs. Also, since the positioning of the breast is not optimum, asymmetric breast parts are often cut off, which are increasingly unacceptable for purchasers of the breast pieces.

SUMMARY OF THE INVENTION

An object of the invention is to improve the positioning of the bird, in particular of its breast, in order for breast-related processing operations to be carried out. It is also an object to optimize the breast cut(s).

A further object of the invention is to optimize the way in which the wings and the legs of the bird are cut off.

Another object of the invention is to provide the option for the division of the bird to take place completely automatically.

In order for one or more of the above-mentioned objects to be achieved, the method according to the invention for carrying out at least one processing operation on a slaughtered bird which is hung by its legs comprises the steps: providing a conveyor with at least one hook for hanging and conveying the bird; providing a processing device with a processing area for carrying out the at least one processing operation on the bird; using the conveyor to convey the bird towards and into the processing area of the processing device; positioning the bird in the processing area of the processing device by externally supporting the bird at at least two locations, selected from the group of locations which comprises the back, the sternum, the area of the clavicle, the wings and the sides of the bird; and carrying out the at least one processing operation in the processing device in the area of the breast of the bird.

Alternatively, the step of positioning the bird in the method according to the invention comprises the step of internally supporting the bird on that side of the sternum which faces towards the abdominal cavity of the bird.

In the two ways mentioned above, it is possible to obtain a very accurate, stable and reproducible positioning of the bird for a wide variety of breast-related processing operations, such as: cutting off part of the breast; removing the skin from the breast; deboning the breast; dividing the carcass into a front half and a rear half; separating the wings from the carcass; and injecting a substance into the breast.

An additional processing operation for a breast-related processing operation is, for example, making a transverse incision in the abdomen below the sternum. In this case, use is preferably made of a sternum support element which acts on that side of the sternum which is directed towards the abdominal cavity of the bird, in the area of the free end of the trabecula mediana. Since this part of the sternum is accessible to the sternum support element from the outside of the bird, this is regarded as external support of the bird. The sternum support element, which may, for example, comprise a guide rail which extends in the path of the sternum, ensures that during the transverse incision the sternum is kept out of the path of the cutting means used, such as a rotating knife.

A similar external sternum support element in the form of a guide which extends in the path of the sternum can be used for cutting off part of the breast, comprising part of the trabecula mediana and each trabecula intermedia. This sternum support element also preferably acts on the sternum in the area of the free end of the trabecula mediana.

Preferably, another sternum support element is introduced into the abdominal cavity of the bird from a neck opening or drawing opening of the bird which has been made in an earlier processing stage, in order to reach the desired location in the area of the sternum, in particular the area of the rostrum sterni or the area of the ventricle.

In a preferred embodiment, the latter sternum support element comprises an arm which can move in a controllable manner, a free end of the arm being adapted to engage the side of the sternum facing the abdominal cavity. In order to make it easier to introduce the sternum support element into the body of the slaughtered animal, a first part of the arm may be pivotably connected to a second part of the arm, in which case the first part can be oriented, in a controllable manner, both substantially in line with the second part and at an angle with respect thereto, for example an angle of substantially 90°.

In an expedient embodiment, the means for positioning the sternum form a single unit with means for positioning the clavicle, so that positioning inaccuracies resulting from tolerances in the tools used are reduced to a minimum.

Preferably, a clavicle support element acts on the concave side of the clavicle, to which end the clavicle support element advantageously comprises a substantially L-shaped arm with a short limb and a long limb, the short limb being intended to engage the concave side of the clavicle. In this case, for optimum positioning of the clavicle, the arm is preferably moved such that the angle between the longitudinal axis of the short limb and a horizontal plane when the short limb is engaging the clavicle is larger than when it is at a distance from the clavicle. As a result, the sternum, which is connected to the clavicle, is pressed against a sternum support element.

Positioning of the body of the bird for the purpose of a partial processing operation comprises the step of: moving the wings with respect to the body, substantially in a direction away from the hips. For this purpose, it is possible to provide a pair of forks which can be displaced in a controllable manner in the vertical direction and each have a pair of downwardly directed limbs, the distance between the limbs of each fork substantially corresponding to a transverse dimension of a wing. Each of the forks is intended to be placed between the hips and the shoulders of the bird, and the forks can pivot, in a controllable manner, between a first angular position, in which the distance between the ends of the pairs of limbs substantially corresponds to the width of the body of a bird between the hips and the shoulders, and a second angular position, in which there is a greater distance between said ends of said pairs of limbs than in said first angular position. In the first angular position of the forks, the body of the bird is positioned between the forks. Then, the forks are moved downwards, with the humerus of each wing moving in between the limbs of a fork. At the same time, or next, the forks are pivoted into their second angular position, with the result that the body of the bird is stretched as a result of a tensile force which is thus exerted between the legs and the wings. This makes it easier to carry out the cutting processing operations on the body.

In a preferred embodiment, the forks are arranged on a common body member, which body member may also comprise a pivotable plate, at least a section of which is intended to be brought into contact with the back of the bird in order to position the back.

In another preferred embodiment, the positioning means comprise a pair of wing support elements which can be displaced in a controllable manner in the vertical direction and each have a downwardly directed hook-like end, which wing support elements are each intended to be placed between the hips and the shoulders of the bird and can pivot, in a controllable manner, between a first angular position, in which their hook-like ends are directed downwards, and a second angular position, in which said ends hook around the wings and are directed substantially towards the back of the bird.

Preferably, while a part of the breast is being cut off, the breast of the bird is pushed away substantially parallel to the plane of the cut and in the direction in which the cut is being made, in particular by means of at least one belt conveyor. In this way, an optimum cut for obtaining a symmetrical breast part of the desired dimensions is obtained both in the method and device according to the invention, but also in other devices, such as devices according to the prior art. The conveying speed of the belt conveyor is preferably selected in such a way that it is greater than or equal to the conveying speed of the conveyor. An optimum action of the conveyor on the breast part which is to be cut off is obtained if the material of the belt is resilient.

In the prior art, the connections between the legs and the body of the bird ensure that cuts for separating the legs from the bird cannot be carried out optimally, since the mobility of the legs with respect to the body is limited. If firstly a transverse incision is made in the abdomen itself, or the breast part is cut off, and the legs are only separated from the body after this, the legs can be directed much more easily and, in addition, are much more accessible to knives in the hip area. Before the legs are cut off the body of the bird, the hips of the bird can be dislocated, which can be easily achieved as a result of the easier manipulation of the legs after the breast part has been cut off the bird in accordance with the invention. Other advantages are obtained during any further processing operations, such as roasting, frying, coating with breadcrumbs and marinating, since undesirable cavities in which substances such as water, breadcrumbs and marinade could accumulate, are avoided.

According to the invention, the dislocation of the hips of the bird which is suspended by its legs from a hook of a moving conveyor comprises the steps of: placing a leg support element against each leg on the side of the leg which faces towards the breast side of the bird; placing a hip support element against each hip on the side of the hip which faces the back of the bird; and exerting oppositely directed forces on the bird by means of the leg support element and the hip support element in order to dislocate the hip joints. Such a method can be carried out completely automatically very well, both in combination with other processing operations on the bird and independently of such operations.

Preferably, the legs are spread apart by exerting oppositely directed forces in the hollows of the knees of the legs, and the leg support element engages the leg in the area of the drumstick. Dislocating the hips of a bird which is suspended from a hook of a moving conveyor can be carried out most easily if the legs of the bird are situated one behind the other, as seen in the conveying direction of the conveyor. In this case, the hip dislocating forces are exerted in a direction which is substantially transverse with respect to the direction of movement of the conveyor while the bird is being conveyed.

In a preferred embodiment, the leg support element and/or the hip support element comprise a guide which runs substantially parallel to or at a small angle to the conveying direction of the conveyor. It is thus extremely simple to obtain an effective hip dislocating device.

In another preferred embodiment, the means for supporting the hip comprise a pair of pins, of which the areas between the ends thereof are designed so as to engage the hips. In particular, the longitudinal axis of the pins is oriented substantially vertically. The use of the pins offers the advantage that the dislocation can be controlled separately for each of the two hips of a bird. As an alternative to pins, it is also possible for the hip support means used to be a pair of wheels, the circumferential sides of which are designed to engage the hips.

According to the invention, the wings of the bird, including a part of the breast or the back of the bird, can be cut off optimally, both in combination with other partial processing operations and independently from such operations, by means of a rotating knife, the corresponding shoulder joint of the bird moving past the knife near the underside thereof, and the active part of the knife moving in substantially the same direction as the shoulder joint. Advantageously, the legs of the bird are in this case situated next to one another, as seen in the conveying direction of the conveyor. The particular manner of cutting allows the wings of the bird to be guided past the knife in a substantially natural position of the wings.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 1a shows a perspective view of an alternative embodiment of the device in accordance with FIG. 1;

FIG. 3 illustrates a perspective view of a positioning step which is carried out on the bird with the aid of the device in accordance with FIG. 1;

FIG. 4 illustrates a perspective view of a following positioning step;

FIG. 6a shows, partially in cross section, the positioning of the bird prior to and during the operation of cutting off said part of the breast;

FIG. 6b shows a side view, on an enlarged scale, of a positioning element;

FIG. 6c shows a front view of the positioning element of FIG. 6b;

FIG. 6d shows a plan view of the positioning element of FIG. 6b;

FIG. 6h illustrates a perspective view of a positioning step which is carried out on the bird with the aid of the device in accordance with FIG. 6e;

FIG. 6i illustrates a perspective view of a following positioning step;

FIG. 6j illustrates a side view of the positioning step in accordance with FIG. 6i;

Throughout the various figures, the same reference numerals relate to the same components or components which have the same function.

FIG. 1 shows two rods 2 and 4 which extend substantially in the vertical direction, and along which a support block 6 can be moved in directions indicated by double arrow 8, by means of drive means, which are not shown in more detail, but are known per se, such as for example an electric, pneumatic or hydraulic actuator or a curved track control unit. The rods 2, 4 are connected to a frame (not shown in more detail) and may either be stationary or move in one of the directions indicated by double arrow 10. The movement in the direction of the arrow 10 may be either rectilinear or curved or a combination of both. The abovementioned frame may comprise a number of the devices shown in FIG. 1, for example in a carousel configuration. The support block 6 is provided with two substantially U-shaped or V-shaped forks 12a, 12b, both of which can pivot through a predetermined angle about corresponding pins 14a and 14b, respectively, in the direction of double arrows 16. The movement of the forks 12a, 12b is controlled in a manner not shown in more detail, for example in a manner which is known per se and uses electric, pneumatic or hydraulic actuators or a curved track control unit. Furthermore, the support block 6 comprises a curved plate 18 which can pivot through a predetermined angle, about an axis 20, in the directions of double arrow 22. The drive for the plate 18 is not shown and may, for example, comprise an electric, pneumatic or hydraulic actuator or a curved track control unit.

As shown in FIG. 2, a slaughtered bird 26 which is hung by its legs from a hook 24 of a conveyor is guided against the support block 6, the forks 12a, 12b being positioned between the hips and the wings of the bird 26. The back side of the bird 26 is directed towards the support block 6. In the situation shown in FIG. 2, the bird 26 is at rest with respect to the support block 6 and the associated components; nevertheless, the combination of the bird 26 and the support block 6 with the associated components may be in motion, for example in one of the directions indicated by the double arrow 10. In such a situation, the support block 6 moves synchronously with a movement of the hook 24 in a conveying path.

The position which is shown in FIG. 2 changes to the position which is shown in FIG. 3. In FIG. 3, compared to FIG. 2, the support block 6 has been moved downwards along the rods 2, 4 with respect to the hook 24, and the forks 12a and 12b have pivoted away from the body of the bird 26 (i.e. fork 12a has pivoted in the clockwise direction through an angle of approximately 60° about the pin 14a, and fork 12b has pivoted in the counterclockwise direction through an angle of approximately 60° about the pin 14b), and the plate 18 has pivoted through an angle of approximately 25° towards the back of the bird 26, about the axis 20. As a result, the bird 26 has to a large extent been moved into a predetermined position, in which the forks 12a and 12b clamp the bird 26 in the vertical direction in that they push the elbow joint 28 between the humerus, on the one hand, and the ulna and radius, on the other hand, downwards and outwards.

Figure 1:
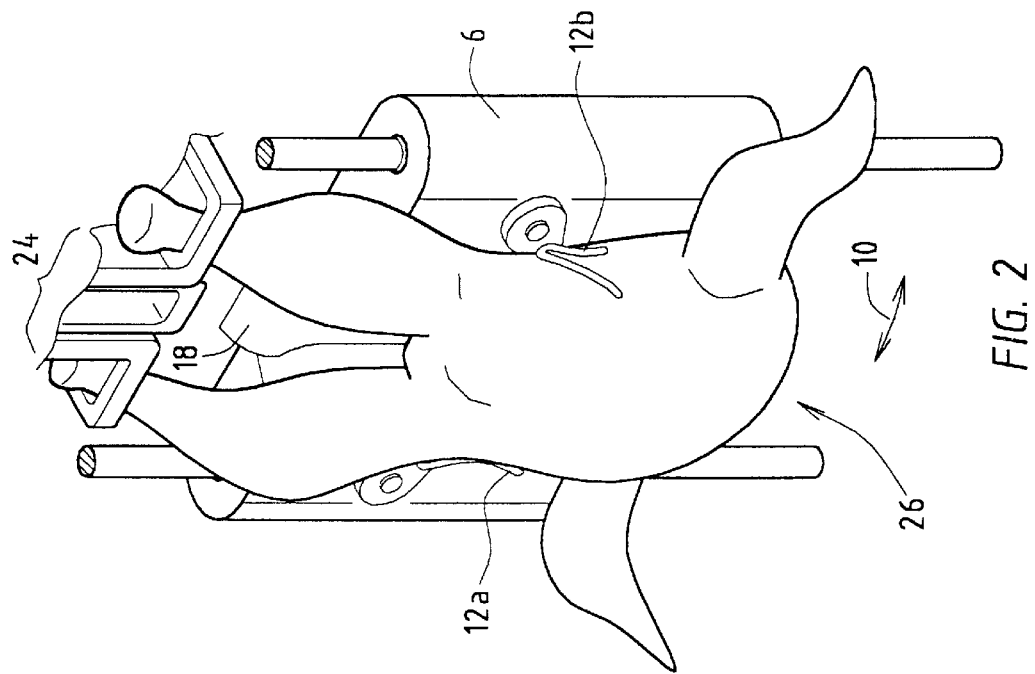
FIG. 1 shows a perspective view of part of a device for positioning a slaughtered bird which is hung by its legs from a hook of a moving conveyor.

As illustrated in more detail in FIG. 4, at the same time as or following the positioning of the bird as shown in FIG. 3, a combined sternum support element 30 and clavicle support element 32 is moved into the body cavity of the bird 26 with the aid of a mechanism which is only shown by way of example and is described below.

In accordance with FIG. 4, the bottom ends of the rods 2 and 4 are connected to one another by means of a bar 34. Two substantially L-shaped arms 36 are attached to the bar 34, which arms are connected to one another, in the area of their free ends, by means of a rotatably mounted pin 38, the centre of which is provided with a continuous hole 40. Furthermore, two strips 42 are connected, on one side, to the arms 36, in such a manner that they can pivot about respective rotation points 44, and, on the other side, are connected to a wheel carrier 48 which is substantially U-shaped in cross section, in such a manner that they can pivot about respective rotation points 56. A rod 50 which is mounted slidably in the hole 40 is fixedly connected to the wheel carrier 48. The rod 50 bears the sternum support element 30 as a laterally projecting rod, and the clavicle support element 32 as a rod which projects parallel to the sternum support element 30. A spring 56 is situated on the rod 50 between the pin 38 and the wheel carrier 48. The wheel carrier 48 is provided with an axle 52 on which a free-running wheel 54 is mounted.

When the above-described structure moves in the direction of arrow 10a, the wheel 54 comes into contact with a rising side of a control element 58. As a result, the rod 50 slides inwards through the hole 40 in the pin 38, in the upwards direction and counter to the force of the spring 56, with the result that the sternum support element 30 and the clavicle support element 32 are moved into the body cavity of the bird 26 via a neck opening which is present in the bird 26. In the process, the free end of the sternum support element 30 moves directly or indirectly against the sternum, in the area of the ventricle, while the upwardly directed side of the clavicle support element 32 acts on the concave side of the clavicle. This is shown in more detail in FIG. 6a, where the clavicle is denoted by the reference numeral 60, the trabecula mediana by the reference numeral 62, and a trabecula intermedia is denoted by the reference numeral 64.

Figure 2:
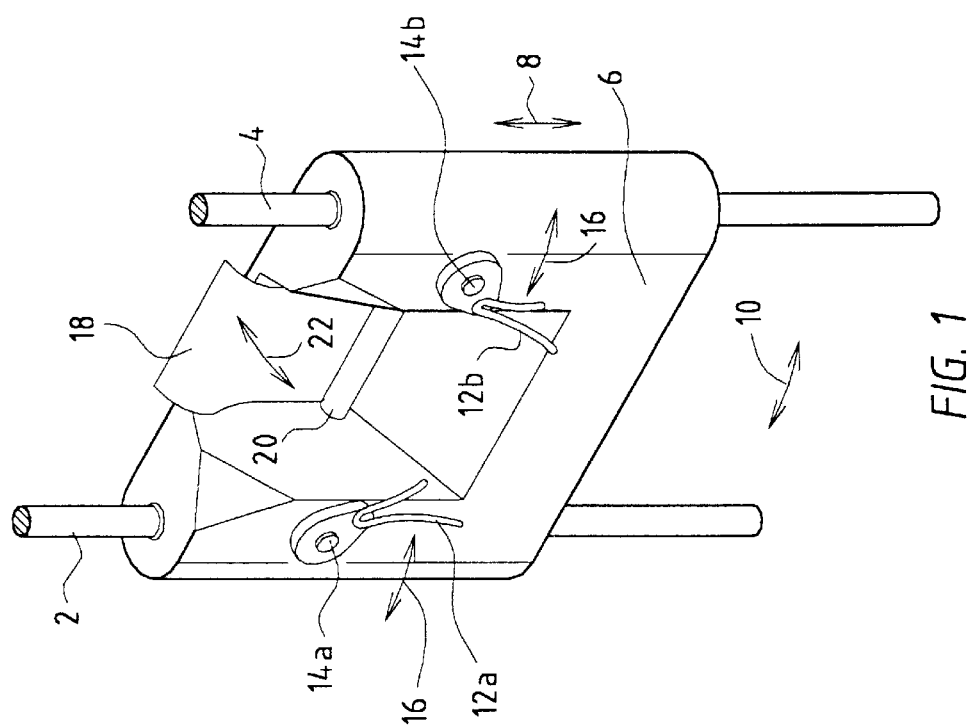
FIG. 2 shows a perspective view of the device in accordance with FIG. 1 in combination with a slaughtered bird which is hung by its legs from a hook of a moving conveyor.

It should also be noted that the design shown in FIG. 4 with the sternum support element 30 and the clavicle support element 32, and the corresponding structure for moving it, is obviously also present in the arrangements shown in FIGS. 1–3, but has been omitted in these FIGS. for the sake of clarity.

Figure 5:
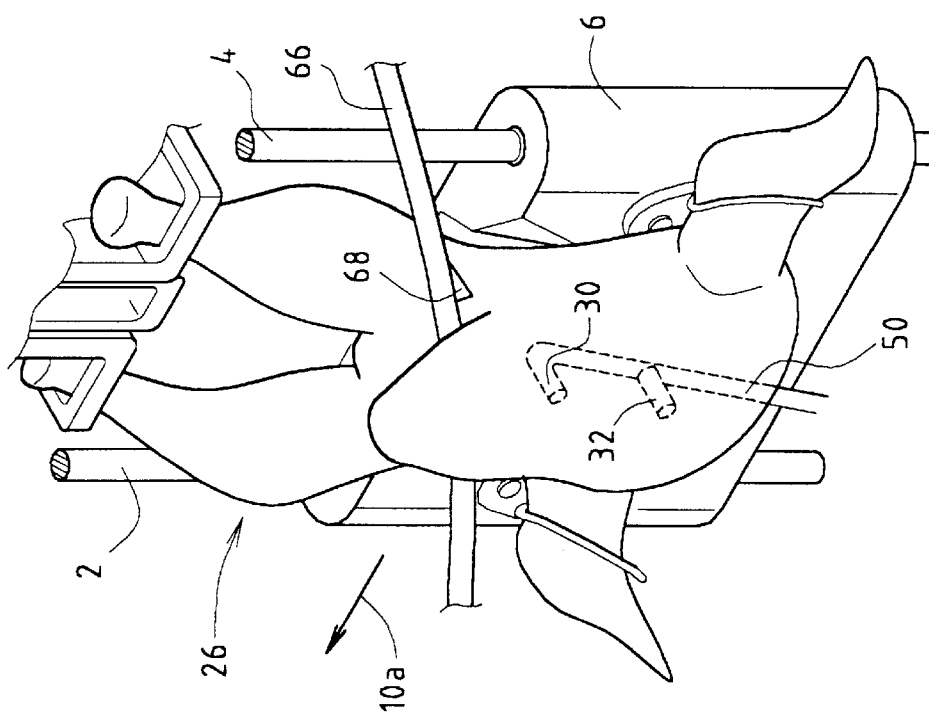
FIG. 5 illustrates a perspective view of a further positioning step.

Once the bird 26 has reached the position illustrated in FIG. 4, it is moved, in accordance with FIG. 5, in the direction of arrow 10a against and along a rod or strip 66 which, on its underside, may be provided with one or more cutting elements 68 or is shaped in such a manner that a desired cutting action is achieved, in order to be able to move the rod 66 to the desired location. The rod 66 acts directly or indirectly on that side of the sternum which is directed towards the abdominal cavity, and pushes it away in a direction directed away from the back of the bird 26. FIG. 6a shows the position of the rod 66 in more detail.

Figure 6:
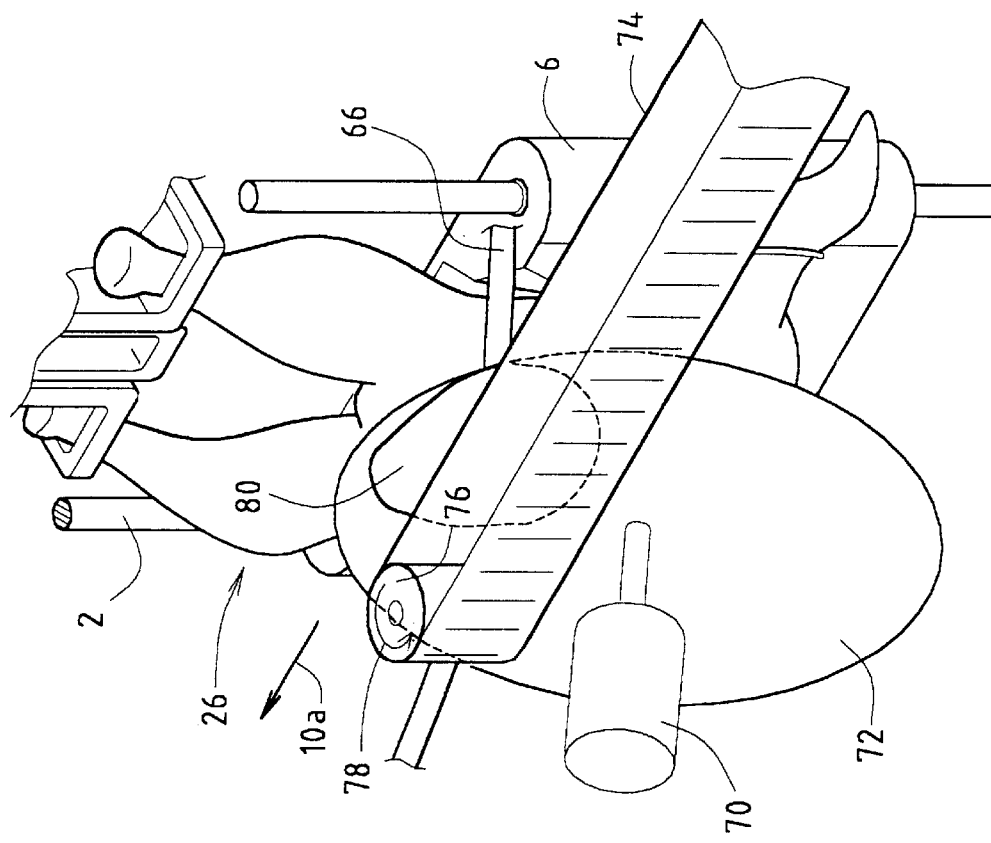
FIG. 6 illustrates in perspective, diagrammatic view processing operations which are to be carried out on the bird in order to cut off a part of the breast.

Then, as shown in FIG. 6, the bird 26 is guided, in the direction of the arrow 10a, past a cutting device comprising a rotating knife 72 which is driven by a motor 70, and a belt 74, which is guided around a roller 76 and is driven, in a manner not shown in more detail, in the direction of arrow 78. The belt 74 acts on a breast part 80 which is to be cut off the bird 26, the speed of the belt 74 being at least equal to, or greater than, the speed of movement of the bird 26 in the direction indicated by the arrow 10a. FIG. 6a provides a detailed illustration of the location where the belt 74 engages the breast part 80 and of the plane (indicated by a dot-dashed line) along which the knife 72 cuts off the breast part 80. The positioning of the bird 26 brought about as shown in FIGS. 4 and 5 and the action of the belt 74 make it possible to reproducibly obtain a symmetrical breast part which comprises part of the trabecula mediana and each trabecula intermedia.

FIG. 1a shows a support block 6a in which the plate 18 as shown in FIGS. 1–3 is not present. In FIG. 1a, the function of the plate 18 is assumed by a rod 19 which is fixed, in a manner not shown in more detail, with respect to the path of the support block 6a, of which the direction of movement is indicated by arrow 10a. At the location indicated in the figure by 19a, the rod 19 has a double bend, the distance between the rod 19 and the rods 2 and 4 to the right of the area 19a being less than the distance between said rods to the left of the area 19a. Since the rod 19 is situated at the level of the back of a bird which is to be positioned in the support block 6a, the back of the bird will be pressed away when it moves past the area 19a of the rod 19. At that moment, the forks 12a, 12b have already been pivoted away from the body of the bird in order to clamp its wings, unlike in the situation of the forks 12a, 12b shown in FIG. 1a.

FIGS. 6b, 6c and 6d show an alternative to the rod 50 shown in FIG. 4, with the sternum support element 30 and the clavicle support element 32. A rod 50a which is shown in FIGS. 6b–6d is provided with a clavicle/sternum support element 32a and a sternum support element 31, the latter being provided with a slot 31a on the side which is facing away from the rod 50a. When the rod 50a is introduced into the body cavity of a bird in the manner which has already been illustrated on the basis of FIG. 4, via a neck opening in the bird, the area which is denoted by 31b comes to rest against the rostrum sterni of the sternum, the spinal column of the bird moving into the slot 31a of the sternum support element 31. As a result of the tapering form of the sternum support element 31, the spinal column is pushed away from the sternum as the sternum support element 31 penetrates further into the body of the bird, and consequently the clavicle will move in the same direction. Since in this way it is easier to control the position of the clavicle than in the situation illustrated in FIG. 4, the clavicle/sternum support element 32a in FIG. 6b can be shorter than the clavicle support element 32 in FIG. 4. This reduces the risk of undesired damage to the bird in its neck area.

Figure 6G:
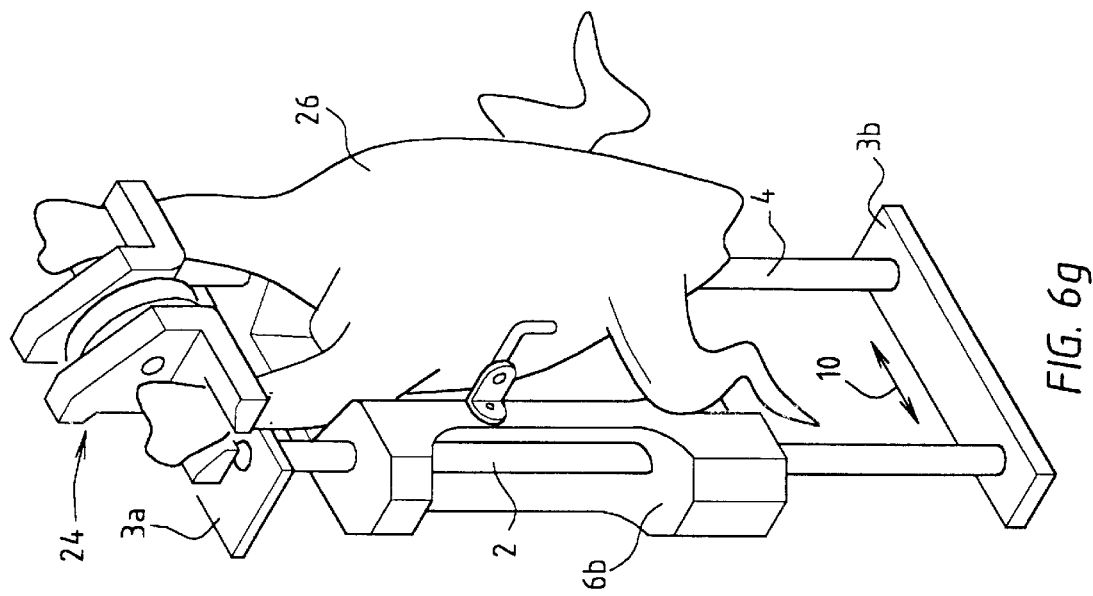
FIG. 6g shows a perspective view of the device in accordance with FIG. 6e in combination with a slaughtered bird which is hung by its legs from a hook of a moving conveyor.
Figure 6F:
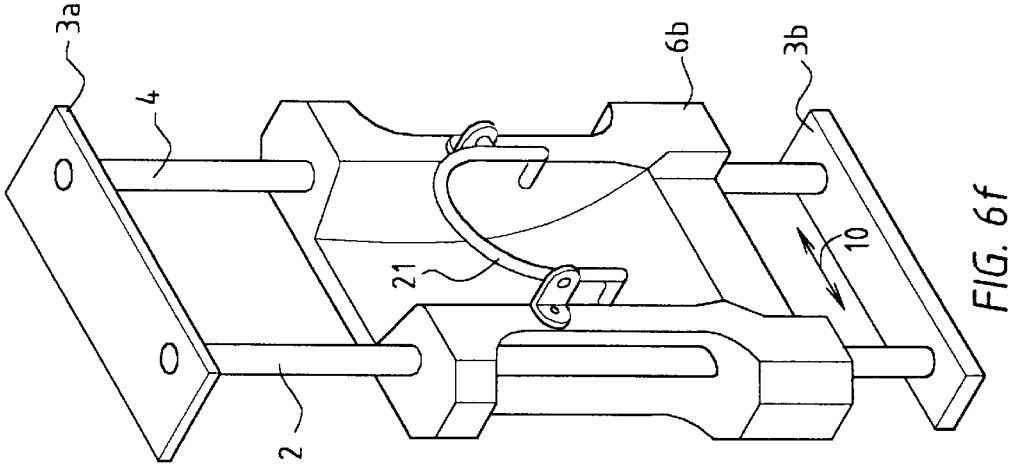
FIG. 6f shows a perspective view of another use position of the device in accordance with FIG. 6e.
Figure 6E:
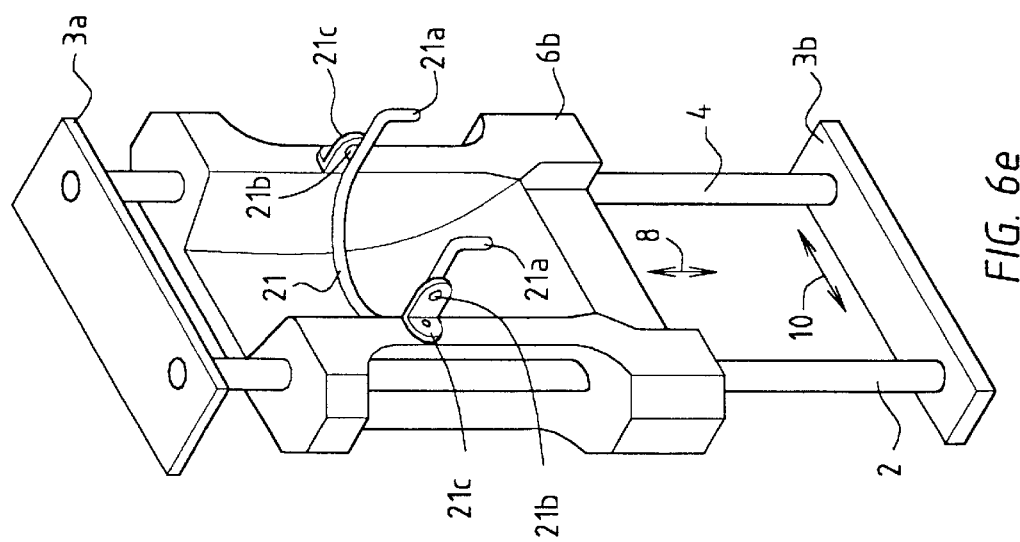
FIG. 6e shows a perspective view of an alternative embodiment of the device in accordance with FIGS. 1–3.

FIGS. 6e and 6f show a support block 6b which can be moved in directions indicated by double arrow 8 and in a manner which can be controlled and is not shown in more detail, along rods 2 and 4 which extend substantially in the vertical direction. The rods 2 and 4 are mounted in plates 3a and 3b, which in turn are fitted in a frame (not shown in more detail). On the support block 6b, a substantially U-shaped bracket 21 with bent ends 21a is mounted on supports 21c in such a manner that it can pivot about pins 21b. As shown in particular in FIG. 6f, the bracket 21 can move from the position shown in FIG. 6e to the position shown in FIG. 6f, and vice versa, to which end a suitable controllable drive, which is not shown in more detail, acts on the pins 21b.

The action of the device illustrated in FIGS. 6e and 6f will now be explained in more detail with reference to FIGS. 6g–6j, which show the device in conjunction with a bird carcass which is hung by its legs from a hook. During this explanation, the position of the bracket shown in FIG. 6e will be referred to as "horizontal", and the position of the bracket 21 shown in FIG. 6f will be referred to as "vertical".

FIG. 6g shows a bird 26 hanging from a hook 24. Both the hook 24 and the assembly of plates 3a, 3b, rods 2, 4 and support block 6b move synchronously in one of the directions 10, the bird being taken between the ends 21a of the bracket 21 in the horizontal position. Then, as illustrated in FIG. 6h, the support block 6b is moved downwards along the rods 2, 4, until the bracket 21 in the horizontal position is situated at the level of the armpits of the bird 26. In a following step, as illustrated by FIGS. 6i and 6j, the bracket 21 is pivoted into its vertical position, the ends 21a of the bracket 21 engaging around the wings of the bird 26. At the same time, the centre part of the bracket 21 pushes against the back of the bird 26. In this way, the bird 26 is excellently positioned and fixed for a following processing operation.

Figure 7:
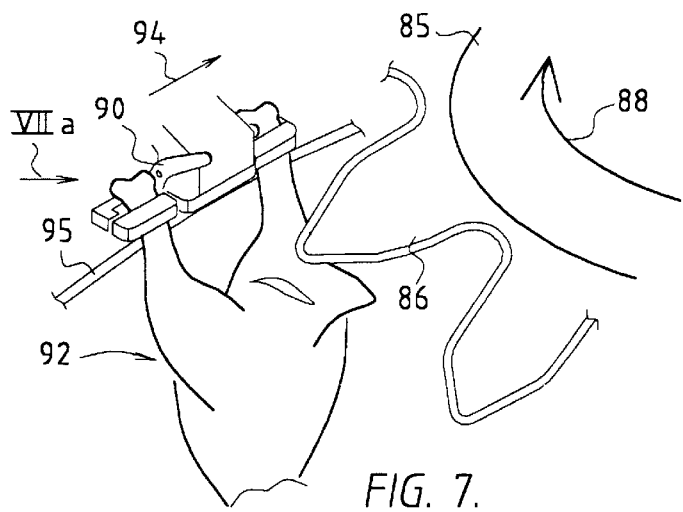
FIG. 7 shows a perspective view from above of part of a device for dislocating the hips of a slaughtered bird which is hung by its legs from a hook of a moving conveyor.
Figure 7A:
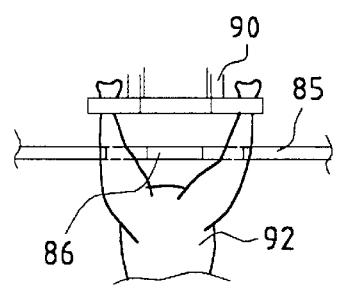
FIG. 7a shows a view in the direction of arrow VIIa in FIG. 7.

FIGS. 7 and 7a show a section of a wheel 85, which is mounted on a frame (not shown in more detail) and along the circumference of which there are projections 86, the free end of which projections is rounded substantially in the shape of a V, merging into a free end with a predetermined transverse direction. The wheel 85 rotates in a direction indicated by arrow 88, the circumferential speed at the foot of the V-shaped free ends of the projections 86 being substantially equal to the conveying speed of a slaughtered bird 92 which is hung by its legs from a hook 90 of a moving conveyor (not shown in more detail). The conveying direction of the hook 90 is indicated by arrow 94. The legs of the bird are supported against a guide 95 at the level of the drumsticks and on the side facing towards the breast of the bird.

Figure 8:
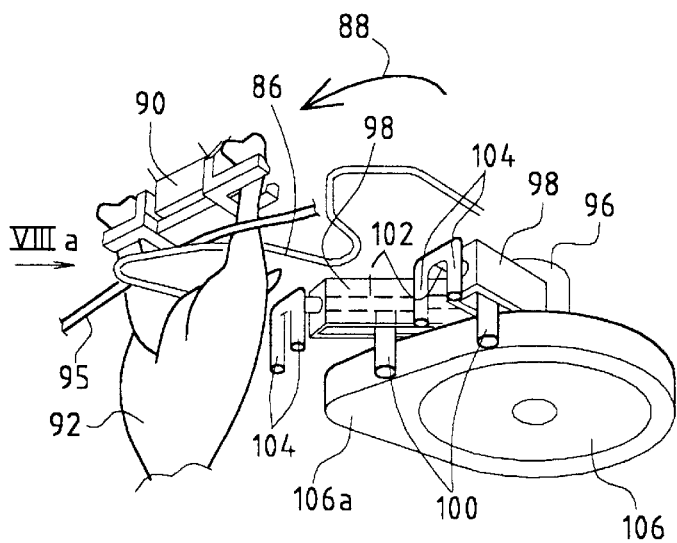
FIG. 8 shows a perspective view, from below, of a part of the device in accordance with FIG. 7.
Figure 8A:
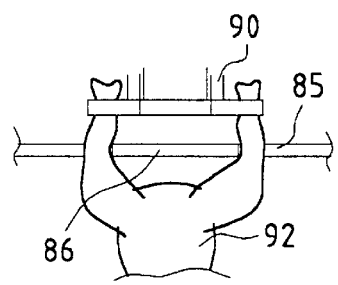
FIG. 8a shows a view in the direction of arrow VIIIa in FIG. 8.

As shown in FIGS. 8 and 8a, one of the projections 86 moves between the legs of the bird 92, at the level of its knees. Since the transverse dimensions at the foot of the projection 86 are greater than the distance between the knees of the bird 92, the legs of the bird are spread apart by the projection 86. As FIG. 8 also shows, the wheel 85 is mounted on an axle 96, and a guide 98 is arranged beneath each projection 86, in which guide there is a rod 102 which is provided with a transverse arm 100 and can move in its longitudinal direction. At one end, each rod 102 bears a pair of pins 104. The guides 98 are arranged in a fixed position with respect to the projections 86 but movably with respect to a stationary cam disc 106 which bears a cam 106a.

Figure 9:
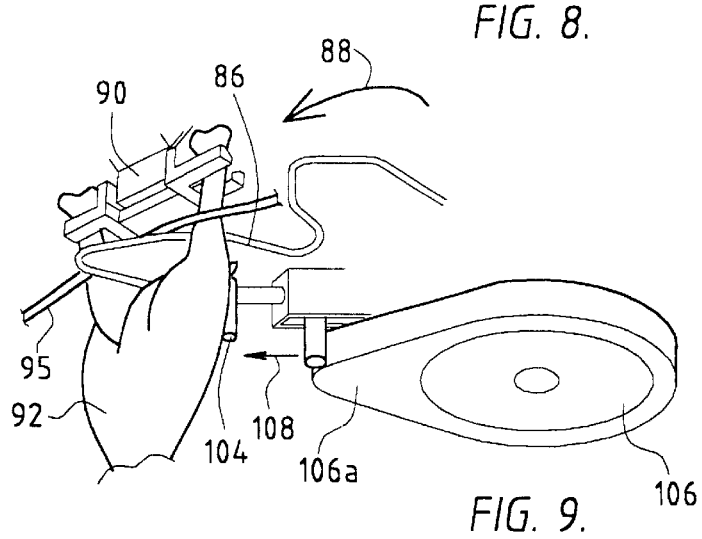
FIG. 9 illustrates a hip-dislocating operation carried out using the device in accordance with FIGS. 7 and 8.

As shown by FIG. 9, as the disc 85 continues to move in the direction of arrow 88, the transverse arm 100 of the rod 102 is moved in the direction of arrow 108 by the cam 106a. As a result, the pins 104 act on the hips of the bird 92, and the hips are dislocated since the legs are spread apart and are held by the guide 95.

Figures 10A, 10B:
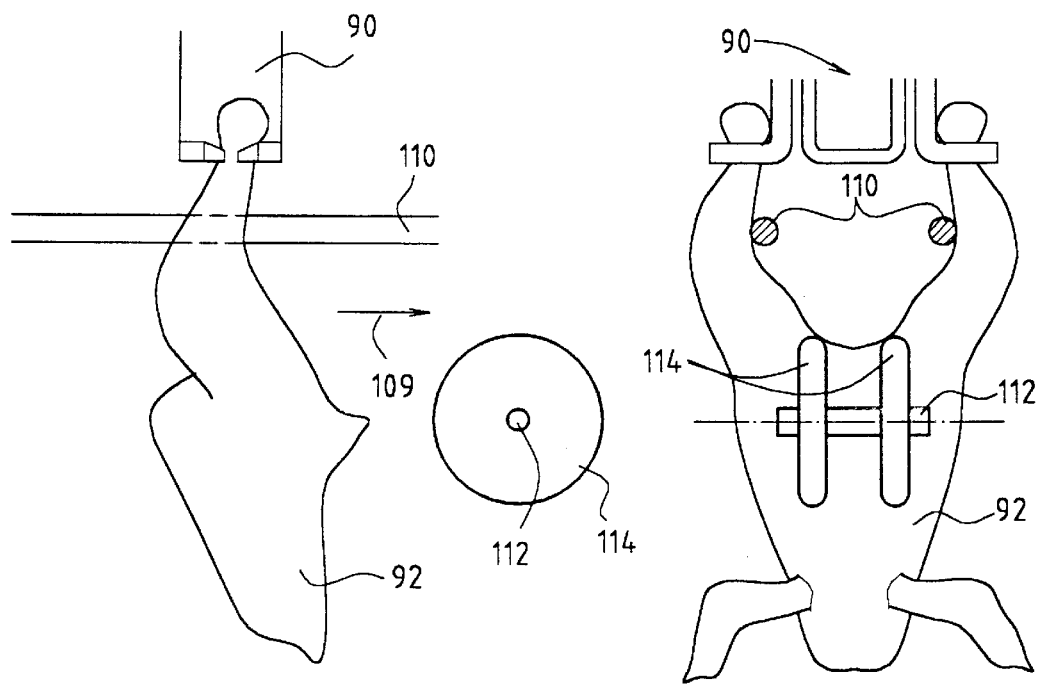
FIGS. 10a and 10b respectively show a side view and a rear view of an alternative embodiment of a device for dislocating the hips of a slaughtered bird which is hung by its legs from a hook of a moving conveyor.

FIGS. 10a and 10b show an alternative hip dislocating device, in which, parallel to the path of a conveyor, which is not shown in more detail and moves in the direction of arrow 109, in front of the hooks 90, a set of guides 110 is arranged, in a manner not shown in more detail, in a frame, in order to spread apart the legs of the bird 92, the guides 110 acting in the area of the knees. A set of wheels 114, which are mounted on an axle 112 in a frame (not shown in more detail), is situated in the path of the bird 92. The wheels may optionally be rotatable about the axle 112. As the movement in the direction of the arrow 109 continues, the bird 92 at the hook 90 is pulled through between the guides 110 and the wheels 114, the circumferential sides of the wheels 114 dislocating the hips of the bird 92.

Figure 11:
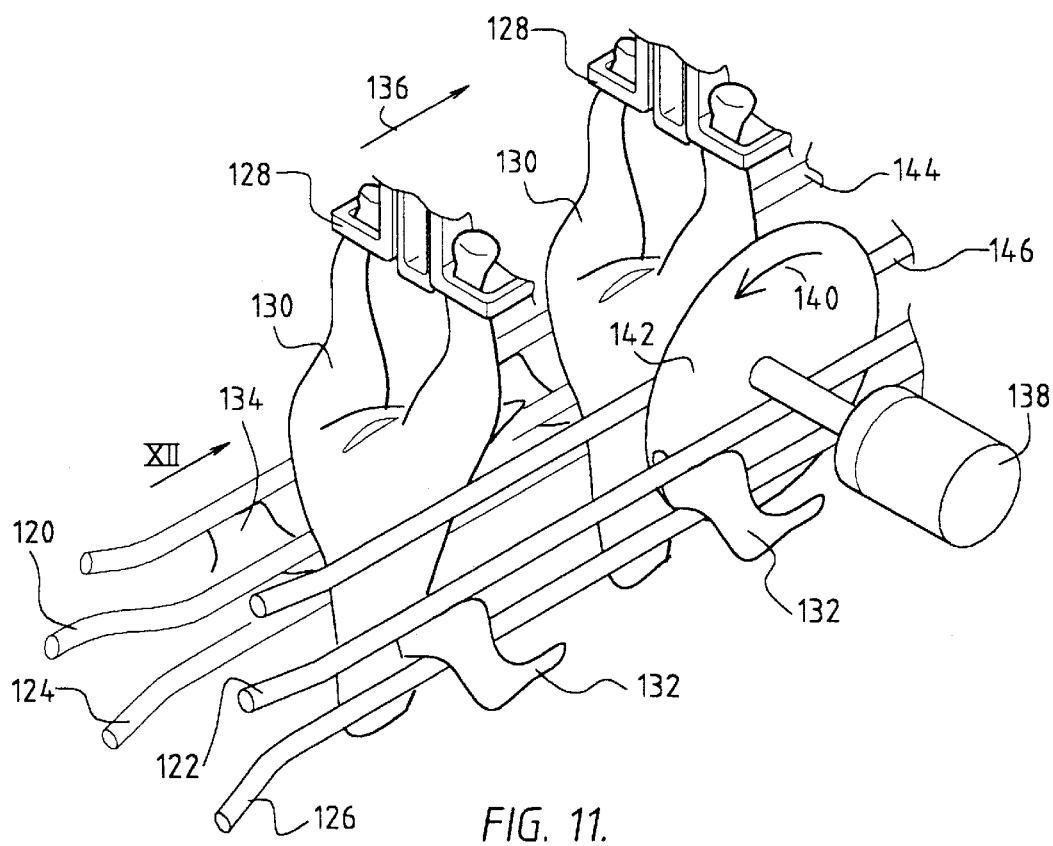
FIG. 11 shows a perspective view of a device for cutting off the wings of a slaughtered bird which is hung by its legs from the hook of a moving conveyor.
Figure 13:
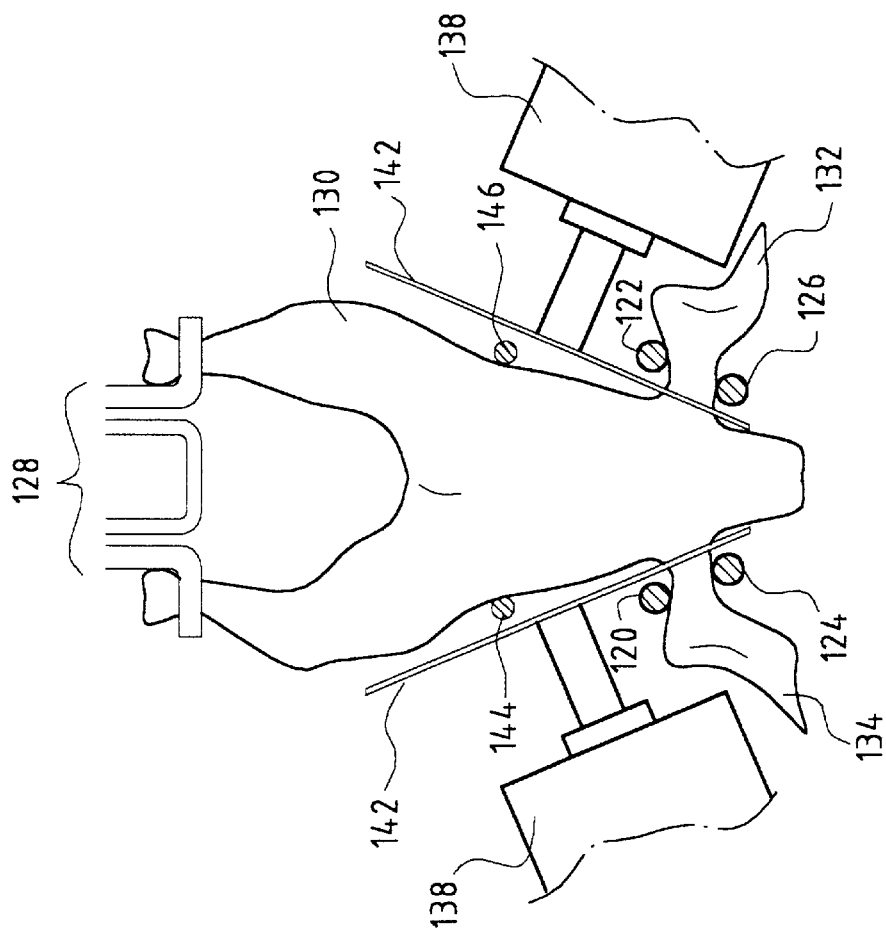
FIG. 13 shows another view, partially in cross section, in the direction of arrow XII in FIG. 11.
Figure 12:
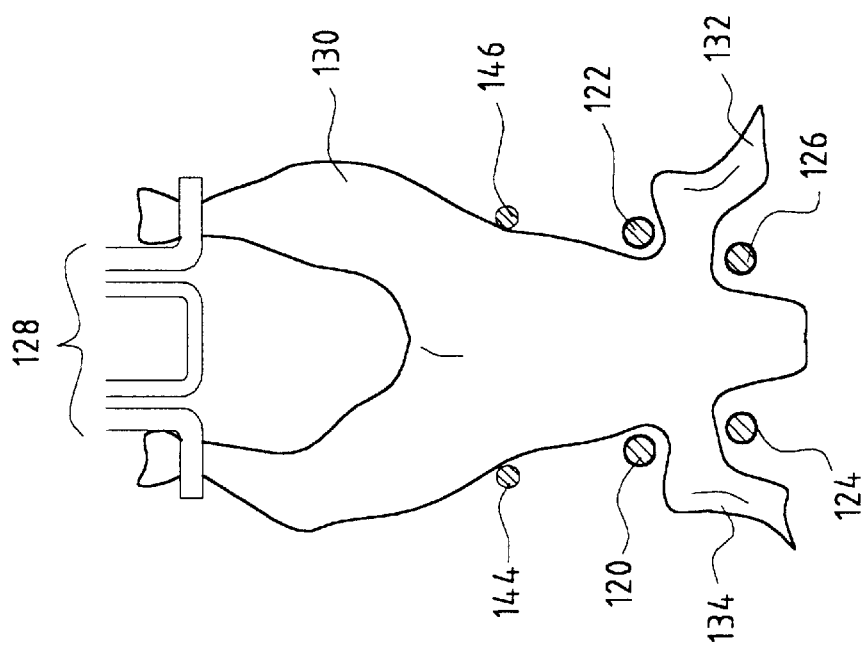
FIG. 12 shows a view, partially in cross-section, in the direction of arrow XII in FIG. 11.

FIGS. 11–13 show the essential components of a device for cutting wings off slaughtered birds which are hung by their legs from a hook of a moving conveyor. The elements shown are attached in a frame, which is not shown in more detail for the sake of clarity. FIGS. 11–13 show four guides 120, 122, 124 and 126 for catching the wings of birds 130 which are hung from hooks 128, and two guides 144, 146 in the transition area between breast and hip. In this case, the right wings 132 are collected between the guides 122 and 126, while the left wings 134 are collected between the guides 120 and 124. Guides 144 and 146 clamp the breast. The birds 130 are moved in the direction of arrow 136. A set of rotating knives 142, which are each driven by a motor 138 in the direction of arrow 140, is arranged in the path of the birds 130, in order to cut the wings 132, 134 off the body of the bird 130. The shoulder joints of the bird 130 move past the rotating knives 142 in the vicinity of the underside thereof, the active part of the knives 142 moving in the same direction as the shoulder joint.

While the invention has been described and illustrated in its preferred embodiments, it should be understood that departures may be made therefrom within the scope of the invention, which is not limited to the details disclosed herein.

What is claimed is:

1. A method for carrying out at least one processing operation on a slaughtered bird which is hung by its legs, comprising the steps:

providing a conveyor with at least one hook for hanging and conveying the bird;

providing a processing device with a processing area for carrying out the at least one processing operation on the bird;

conveying the bird towards and into the processing area of the processing device with the conveyor;

positioning the bird in the processing area of the processing device by positioning means for externally supporting the bird at at least two locations, selected from the group of locations which comprises the back, the sternum, the area of the clavicle, the wings and the sides of the bird; and carrying out the at least one processing operation of the processing device in the area of the breast of the bird, wherein the conveyor is moved synchronously with the positioning means so that the bird remains on the at least one hook while it is positioned by the positioning means.

2. The method of claim 1, wherein the step of carrying out the at least one processing operation comprises making a transverse incision in the abdomen below the sternum.

3. The method of claim 2, wherein the hips of the bird are dislocated after the transverse incision has been made in the abdomen.

4. The method of claim 3, wherein the dislocation of the hips comprises the steps:

spreading the legs apart;

placing a leg support element against each leg, on the side of the leg which faces towards the breast side of the bird;

placing a hip support element against each hip, on the side of the hip which faces towards the back of the bird; and exerting oppositely directed forces on the bird by means of the leg support element and the hip support element, in order to dislocate the hip joints.

5. The method of claim 4, wherein the legs are spread apart by exerting oppositely directed forces in the hollows of the knees of the legs.

6. The method of claim 4, wherein the leg support element engages the leg in the area of the drumstick.

7. The method of claim 1, wherein the hip dislocating forces are exerted in a direction which is substantially transverse with respect to the direction of movement of the conveyor while the bird is being conveyed.

8. The method of claim 1, wherein the step of carrying out the at least one processing operation comprises cutting off part of the breast, comprising part of the trabecula mediana and each trabecula intermedia.

9. The method of claim 8, wherein the breast of the bird, while said part of the breast is being cut off, is pushed away substantially parallel to the plane of the cut and in the direction in which the cut is being made.

10. The method of claim 1, wherein the step of positioning the bird comprises the step of positioning the back by applying at least one back support element engaging the back.

11. The method of claim 1, wherein the step of positioning the bird comprises the step of positioning the sternum by applying at least one sternum support element engaging the sternum.

12. The method of claim 11, wherein the sternum support element engages the side of the sternum facing the abdomen side of the bird, in the area of the free end of the trabecula mediana.

13. The method of claim 11 for use on a bird with a neck opening, wherein the sternum support element is introduced into the abdominal cavity of the bird from the neck opening.

14. The method of claim 13, wherein the sternum support element engages the sternum in the area of the rostrum sterni.

15. The method of claim 13, wherein the sternum support element engages the sternum in the area of the ventricle.

16. The method of claim 11 for use on a bird with an evisceration opening, wherein the sternum support element is introduced into the abdominal cavity of the bird from the evisceration opening.

17. The method of claim 1, wherein the step of positioning the bird comprises the step of positioning the clavicle by applying a clavicle support element which acts in the area of the clavicle.

18. The method of claim 17, wherein the clavicle support element engages the clavicle on the concave side of the clavicle.

19. The method of claim 1, wherein the step of positioning the bird comprises the step of moving the wings with respect to the body of the bird, substantially in a direction away from the hips of the bird.

20. The method of claim 1, wherein the legs of the bird are situated one behind the other, as seen in the conveying direction of the conveyor.

21. The method of claim 1, wherein each wing of the bird is cut off by means of a rotating knife, the corresponding shoulder joint of the bird moving past the knife in the vicinity of its underside, and the active part of the knife moving substantially in the same direction as the shoulder joint.

22. The method of claim 21, wherein the legs of the bird are situated next to one another, as seen in the conveying direction of the conveyor.

23. A method for carrying out at least one processing operation on a slaughtered bird which is hung by its legs, comprising the steps:

providing a conveyor with at least one hook for hanging and conveying the bird, wherein the bird comprises a neck opening;

providing a processing device with a processing area for carrying out the at least one processing operation on the bird;

conveying the bird towards and into the processing area of the processing device with the conveyor;

positioning the bird in the processing area of the processing device by internally supporting the bird on the side of the sternum facing the abdominal cavity of the bird by introducing at least one sternum support element for engaging the sternum into the abdominal cavity of the bird from the neck opening; and carrying out the at least one processing operation of the processing device in the area of the breast of the bird.

24. The method of claim 23, wherein the step of carrying out the at least one processing operation comprises making a transverse incision in the abdomen below the sternum.

25. The method of claim 23, wherein the step of carrying out the at least one processing operation comprises cutting off part of the breast, comprising part of the trabecula mediana and each trabecula intermedia.

26. The method of claim 25, wherein the breast of the bird, while said part of the breast is being cut off, is pushed away substantially parallel to the plane of the cut and in the direction in which the cut is being made.

27. The method of claim 23, wherein the step of positioning the bird comprises the step of positioning the back by applying at least one back support element engaging the back.

28. The method of claim 23, wherein the sternum support element engages the side of the sternum facing the abdomen side of the bird, in the area of the free end of the trabecula mediana.

29. The method of claim 23, wherein the sternum support element engages the sternum in the area of the rostrum sterni.

30. The method of claim 23, wherein the sternum support element engages the sternum in the area of the ventricle.

31. The method of claim 23, wherein the step of positioning the bird comprises the step of moving the wings with respect to the body of the bird, substantially in a direction away from the hips of the bird.

32. The method of claim 23, wherein the legs of the bird are situated one behind the other, as seen in the conveying direction of the conveyor.

33. The method of claim 23, wherein each wing of the bird is cut off by means of a rotating knife, the corresponding shoulder joint of the bird moving past the knife in the vicinity of its underside, and the active part of the knife moving substantially in the same direction as the shoulder joint.

34. The method of claim 33, wherein the legs of the bird are situated next to one another, as seen in the conveying direction of the conveyor.

35. A method for carrying out at least one processing operation on a slaughtered bird which is hung by its legs, comprising the steps:

providing a conveyor with at least one hook for hanging and conveying the bird;

providing a processing device with a processing area for carrying out the at least one processing operation on the bird;

conveying the bird towards and into the processing area of the processing device with the conveyor;

positioning the bird in the processing area of the processing device by internally supporting the bird on the side of the sternum facing the abdominal cavity of the bird, wherein the step of positioning the bird comprises the step of positioning the clavicle by applying a clavicle support element which acts in the area of the clavicle; and carrying out the at least one processing operation of the processing device in the area of the breast of the bird.

36. The method of claim 35, wherein the clavicle support element engages the clavicle on the concave side of the clavicle.

37. A method for carrying out at least one processing operation on a slaughtered bird which is hung by its legs, comprising the steps:

providing a conveyor with at least one hook for hanging and conveying the bird;

providing a processing device with a processing area for carrying out the at least one processing operation on the bird;

conveying the bird towards and into the processing area of the processing device with the conveyor;

positioning the bird in the processing area of the processing device by internally supporting the bird on the side of the sternum facing the abdominal cavity of the bird; and carrying out the at least one processing operation of the processing device in the area of the breast of the bird, wherein the at least one processing operation comprises making a transverse incision in the abdomen below the sternum; and dislocating the hips of the bird after the transverse incision has been made in the abdomen.

38. The method of claim 37, wherein the dislocation of the hips comprises the steps:

spreading the legs apart;

placing a leg support element against each leg, on the side of the leg which faces towards the breast side of the bird;

placing a hip support element against each hip, on the side of the hip which faces towards the back of the bird; and exerting oppositely directed forces on the bird by means of the leg support element and the hip support element, in order to dislocate the hip joints.

39. The method of claim 38, wherein the legs are spread apart by exerting oppositely directed forces in the hollows of the knees of the legs.

40. The method of claim 38, wherein the leg support element engages the leg in the area of the drumstick.

41. The method of claim 38, wherein the hip dislocating forces are exerted in a direction which is substantially transverse with respect to the direction of movement of the conveyor while the bird is being conveyed.

42. A device for carrying out at least one processing operation on a slaughtered bird which is hung by its legs, comprising:

a conveyor with at least one hook for hanging and conveying the bird;

a processing device with a processing area for carrying out the at least one processing operation on the bird, the conveyor being adapted to convey the bird towards and into the processing area of the processing device;

positioning means for positioning the bird in the processing area of the processing device by externally supporting the bird at at least two locations, selected from the group of locations which comprises the back, the sternum, the area of the clavicle, the wings and the sides of the bird; and processing means for carrying out at least one processing operation of the processing device in the area of the breast of the bird, wherein the conveyor is adapted to move synchronously with the positioning means so that the bird may remain on the at least one hook while it is positioned by the positioning means.

43. The device of claim 42, comprising:

processing means for making a transverse incision in the abdomen below the sternum.

44. The device of claim 42, comprising:

processing means for cutting off part of the breast, comprising a part of the trabecula mediana and each trabecula intermedia.

45. The device of claim 44, wherein the processing means comprise a rotating knife which interacts with at least one belt conveyor in order, while the said part of the breast is being cut off, to push the breast away substantially parallel to the plane of the cut and in the direction in which the cut is being made.

46. The device of claim 45, wherein the conveying speed of the belt conveyor is equal to or greater than the conveying speed of the conveyor.

47. The device of claim 45, wherein the material of the belt is resilient.

48. The device of claim 42, wherein the positioning means comprise back positioning means for positioning the back.

49. The device of claim 48, wherein the back positioning means comprise a pivotable back-support element, at least a part of which is adapted to be brought into contact with the back of the bird.

50. The device of claim 49, wherein the back-support element is a plate.

51. The device of claim 49, wherein the back-support element is a bracket.

52. The device of claim 42, wherein the positioning means comprise sternum positioning means for positioning the sternum.

53. The device of claim 52, wherein the sternum-positioning means comprise a guide rail which extends within the path of the sternum, and is adapted to engage the side of the sternum facing the abdominal cavity.

54. The device of claim 52, wherein the sternum positioning means comprise an arm which can be moved in a controllable manner, one free end of the arm being adapted to act on the side of the sternum facing the abdominal cavity.

55. The device of claim 54, wherein a first part of the arm is pivotably connected to a second part of the arm, and in which the first part can be oriented, in a controllable manner, both substantially in line with the second part and at an angle with respect thereto.

56. The device of claim 54, wherein the sternum positioning means are adapted to engage the sternum in the area of the ventricle.

57. The device of claim 54, wherein the sternum positioning means are adapted to engage the sternum in the area of the rostrum sterni.

58. The device of claim 52, wherein the sternum positioning means are adapted to engage the sternum in the area of the ventricle.

59. The device of claim 52, wherein the sternum positioning means are adapted to engage the sternum in the area of the rostrum sterni.

60. The device of claim 52, further comprising clavicle positioning means for positioning the clavicle, wherein the clavicle positioning means form a single unit with the sternum positioning means.

61. The device of claim 60, wherein the angle between the longitudinal axis of the short limb and a horizontal plane when the short limb is engaging the clavicle is larger than when it is at a distance from the clavicle.

62. The device of claim 42, wherein the positioning means comprise clavicle positioning means for positioning the clavicle.

63. The device of claim 62, wherein the clavicle positioning means comprise a substantially L-shaped arm which can be moved in a controllable manner and has a short limb and a long limb, the short limb being adapted to engage the concave side of the clavicle.

64. The device of claim 42, wherein the positioning means comprise a pair of forks which can be moved in a controllable manner in the vertical direction, each with a pair of downwardly directed limbs, the distance between the limbs of each fork substantially corresponding to a transverse dimension of a wing, which forks are adapted each to be placed between the hips and the shoulders of the bird and can pivot, in a controllable manner, between a first angular position, wherein the ends of the pairs of limbs have a distance between them which substantially corresponds to the width of the body of a bird between the hips and the shoulders, and a second angular position, wherein said ends of said pairs of limbs have a greater distance between them than in the said first angular position.

65. The device of claim 64, wherein the forks are arranged on a common support body.

66. The device of claim 65, wherein the positioning means comprise back positioning means which are arranged on said common support body.

67. The device of claim 42, wherein the positioning means comprise a pair of wing support elements which can be moved in a controllable manner in the vertical direction, each with a downwardly directed hook-like end, which wing support elements are adapted each to be positioned between the hips and the shoulders of the bird and can pivot in a controllable manner between a first angular position, wherein their hook-like ends are directed downwards, and a second angular position, wherein said ends hook around the wings and are directed substantially towards the back of the bird.

68. The device of claim 42, comprising:
spreading means for spreading the legs apart;
leg support means for exerting a force which is directed towards the leg on the side of the leg which faces the breast side of the bird;
hip support means for exerting a force which is directed towards the hip on the side of the hip which faces the back of the bird;
the leg support means being adapted to interact with the hip support means in order to dislocate the hip.

69. The device of claim 68, wherein the leg support means are adapted to engage the leg in the area of the drumstick.

70. The device of claim 68, wherein the leg support means and/or the hip support means comprise a guide which runs substantially parallel to or at a slight angle to the conveying direction of the conveyor.

71. The device of claim 68, wherein the hip support means comprise a pair of pins, of which the areas between their ends are adapted to engage the hips.

72. The device of claim 71, wherein the longitudinal axis of the pins is directed substantially vertically.

73. The device of claim 68, wherein the hip support means comprise a pair of wheels, the circumferential sides of which are adapted to engage the hips.

74. The device of claim 42, comprising:
a rotating knife for cutting off a wing of the bird, the knife being arranged in such a manner that the shoulder joint, which is associated with the wing, of the bird moves past the knife in the vicinity of its underside, and the active part of the knife moving in substantially the same direction as the shoulder joint.

75. A device for carrying out at least one processing operation on a slaughtered bird which is hung by its legs, comprising:
a conveyor with at least one hook for hanging and conveying the bird, wherein the bird comprises a neck opening;
a processing device with a processing area for carrying out the at least one processing operation on the bird, the conveyor being adapted to convey the bird towards and into the processing area of the processing device;
positioning means for positioning the bird in the processing area of the processing device by internally supporting the bird on the side of the sternum facing the abdominal cavity of the bird, wherein the positioning means comprise sternum positioning means for positioning the sternum and wherein the sternum positioning means is introduced into the abdominal cavity of the bird from the neck opening; and
processing means for carrying out the at least one processing operation of the processing device in the area of the breast of the bird. direction in which the cut is being made.

76. The device of claim 75, comprising:
processing means for making a transverse incision in the abdomen below the sternum.

77. The device of claim 75, comprising:
processing means for cutting off part of the breast, comprising a part of the trabecula mediana and each trabecula intermedia.

78. The device of claim 77, wherein the processing means comprise a rotating knife which interacts with at least one belt conveyor in order, while the said part of the breast is being cut off, to push the breast away substantially parallel to the plane of the cut and in the distance between them than in the said first angular position.

79. The device of claim 78, wherein the conveying speed of the belt conveyor is equal to or greater than the conveying speed of the conveyor.

80. The device of claim 78, wherein the material of the belt is resilient.

81. The device of claim 75, wherein the positioning means comprise back positioning means for positioning the back.

82. The device of claim 81, wherein the back positioning means comprise a pivotable back-support element, at least a part of which is adapted to be brought into contact with the back of the bird.

83. The device of claim 82, wherein the back-support element is a plate.

84. The device of claim 82, wherein the back-support element is a bracket.

85. The device of claim 75, wherein the sternum-positioning means comprise a guide rail which extends within the path of the sternum, and is adapted to engage the side of the sternum facing the abdominal cavity.

86. The device of claim 75, wherein the sternum positioning means comprise an arm which can be moved in a controllable manner, one free end of the arm being adapted to act on the side of the sternum facing the abdominal cavity.

87. The device of claim 86, wherein a first part of the arm is pivotably connected to a second part of the arm, and in which the first part can be oriented, in a controllable manner, both substantially in line with the second part and at an angle with respect thereto.

88. The device of claim 86, wherein the sternum positioning means are adapted to engage the sternum in the area of the ventricle.

89. The device of claim 86, wherein the sternum positioning means are adapted to engage the sternum in the area of the rostrum sterni.

90. The device of claim 75, wherein the sternum positioning means are adapted to engage the sternum in the area of the ventricle.

91. The device of claim 75, wherein the sternum positioning means are adapted to engage the sternum in the area of the rostrum sterni.

92. The device of claim 75, wherein the positioning means comprise a pair of forks which can be moved in a controllable manner in the vertical direction, each with a pair of downwardly directed limbs, the distance between the limbs of each fork substantially corresponding to a transverse dimension of a wing, which forks are adapted each to be placed between the hips and the shoulders of the bird and can pivot. in a controllable manner, between a first angular position, wherein the ends of the pairs of limbs have a distance between them which substantially corresponds to the width of the body of a bird between the hips and the shoulders, and a second angular position, wherein said ends of said pairs of limbs have a greater distance between them than in the said first angular position.

93. The device of claim 92, wherein the forks are arranged on a common support body.

94. The device of claim 93, wherein the positioning means comprise back positioning means, which are arranged on said common support body.

95. The device of claim 75, wherein the positioning means comprise a pair of wing support elements which can be moved in a controllable manner in the vertical direction, each with a downwardly directed hook-like end, which wing support elements are adapted each to be positioned between the hips and the shoulders of the bird and can pivot in a controllable manner between a first angular position, wherein their hook-like ends are directed downwards, and a second angular position, wherein said ends hook around the wings and are directed substantially towards the back of the bird.

96. The device of claim 75, comprising:
 a rotating knife for cutting off a wing of the bird, the knife being arranged in such a manner that the shoulder joint, which is associated with the wing, of the bird moves past the knife in the vicinity of its underside, and the active part of the knife moving in substantially the same direction as the shoulder joint.

97. A device for carrying out at least one processing operation on a slaughtered bird which is hung by its legs, comprising:
 a conveyor with at least one hook for hanging and conveying the bird;
 a processing device with a processing area for carrying out the at least one processing operation on the bird, the conveyor being adapted to convey the bird towards and into the processing area of the processing device;
 positioning means for positioning the bird in the processing area of the processing device by internally supporting the bird on the side of the sternum facing the abdominal cavity of the bird, wherein the positioning means comprise clavicle positioning means for positioning the clavicle; and
 processing means for carrying out the at least one processing operation of the processing device in the area of the breast of the bird.

98. The device of claim 97, wherein the clavicle positioning means comprise a substantially L-shaped arm which can be moved in a controllable manner and has a short limb and a long limb, the short limb being adapted to engage the concave side of the clavicle.

99. The device of claim 97, wherein the positioning means further comprises sternum positioning means for positioning the sternum and wherein the clavicle positioning means form a single unit with the sternum positioning means.

100. The device of claim 98, wherein the angle between the longitudinal axis of the short limb and a horizontal plane when the short limb is engaging the clavicle is larger than when it is at a distance from the clavicle.

101. A device for carrying out at least one processing operation on a slaughtered bird which is hung by its legs, comprising:
 a conveyor with at least one hook for hanging and conveying the bird;
 a processing device with a processing area for carrying out the at least one processing operation on the bird, the conveyor being adapted to convey the bird towards and into the processing area of the processing device;
 positioning means for positioning the bird in the processing area of the processing device by internally supporting the bird on the side of the sternum facing the abdominal cavity of the bird; and
 processing means for carrying out the at least one processing operation of the processing device in the area of the breast of the bird;
 spreading means for spreading the legs apart;
 leg support means for exerting a force which is directed towards the leg on the side of the leg which faces the breast side of the bird;

hip support means for exerting a force which is directed towards the hip on the side of the hip which faces the back of the bird, wherein the leg support means is adapted to interact with the hip support means in order to dislocate the hip.

102. The device of claim 101, wherein the leg support means are adapted to engage the leg in the area of the drumstick.

103. The device of claim 101, wherein the leg support means and/or the hip support means comprise a guide which runs substantially parallel to or at a slight angle to the conveying direction of the conveyor.

104. The device of claim 101, wherein the hip support means comprise a pair of pins, of which the areas between their ends are adapted to engage the hips.

105. The device of claim 104, wherein the longitudinal axis of the pins is directed substantially vertically.

106. The device of claim 101, wherein the hip support means comprise a pair of wheels, the circumferential sides of which are adapted to engage the hips.

107. A method for carrying out at least one processing operation on a slaughtered bird which is h Ig by its legs, comprising the steps:

providing a conveyor with at least one hook for hanging and conveying the bird;

providing a processing device with a processing area for carrying out the at least one processing operation on the bird;

conveying the bird towards and into the processing area of the processing device with the conveyor;

positioning the bird in the processing area of the processing device by internally supporting the bird on the side of the sternum facing the abdominal cavity of the bird and by supporting the wings of the bird near the elbow joint; and carrying out the at least one processing operation of the processing device in the area of the breast of the bird.

108. A device for carrying out at least one processing operation on a slaughtered bird which is hung by its legs, comprising:

a conveyor with at least one hook for hanging and conveying the bird;

a processing device with a processing area for carrying out the at least one processing operation on the bird, the conveyor being adapted to convey the bird towards and into the processing area of the processing device;

positioning means for positioning the bird in the processing area of the processing device by internally supporting the bird on the side of the sternum facing the abdominal cavity of the bird and by supporting the wings of the bird near the elbowjoint; and processing means for carrying out the at least one processing operation of the processing device in the area of the breast of the bird.

* * * * *